(12) United States Patent
Voglewede et al.

(10) Patent No.: US 8,792,464 B2
(45) Date of Patent: Jul. 29, 2014

(54) COMMUNICATION NETWORK FOR DETECTING UNCOOPERATIVE COMMUNICATIONS DEVICE AND RELATED METHODS

(75) Inventors: Paul E. Voglewede, Chili, NY (US); Nick A. Van Stralen, Bloomfield, NY (US); William N. Furman, Fairport, NY (US); Clifford Hessel, Rochester, NY (US); Fred C. Kellerman, Webster, NY (US); James J. Hood, Victor, NY (US); Richard J. Buckley, Henrietta, NY (US); Dennis Martinez, Westford, MA (US)

(73) Assignee: Harris Corporation, Melbourne, FL (US)

( * ) Notice: Subject to any disclaimer, the term of this patent is extended or adjusted under 35 U.S.C. 154(b) by 273 days.

(21) Appl. No.: 13/407,964

(22) Filed: Feb. 29, 2012

(65) Prior Publication Data
US 2013/0223417 A1    Aug. 29, 2013

(51) Int. Cl.
*H04W 72/04* (2009.01)
*H04B 7/04* (2006.01)
*H04W 4/00* (2009.01)
*H04W 84/04* (2009.01)

(52) U.S. Cl.
CPC .............. *H04W 72/0446* (2013.01); *H04B 7/04* (2013.01); *H04W 4/00* (2013.01); *H04W 84/045* (2013.01)
USPC ........... 370/337; 370/330; 370/341; 370/349; 455/456.5

(58) Field of Classification Search
CPC ..... H04W 8/10; H04W 60/04; H04W 84/045; H04W 72/04; H04B 7/04
USPC .................................................. 370/328, 337
See application file for complete search history.

(56) References Cited

U.S. PATENT DOCUMENTS

| 5,451,956 | A |   | 9/1995 | Lochhead |
| 5,719,584 | A | * | 2/1998 | Otto ............................. 342/465 |
| 6,201,495 | B1 |   | 3/2001 | Lemelson et al. |
| 6,407,703 | B1 | * | 6/2002 | Minter et al. ................. 342/450 |

(Continued)

FOREIGN PATENT DOCUMENTS

WO    2010063469    6/2010

OTHER PUBLICATIONS

"3rd Generation Partnership Project; Technical Specification Group Radio Access Network; Stage 2 functional specification of user equipment (UE) positioning in UTRAN (release 10)", 3GPP Standard, No. V10.0.0, Oct. 2010, pp. 1-80.

(Continued)

*Primary Examiner* — Jeffrey M Rutkowski
*Assistant Examiner* — Rasha Fayed
(74) *Attorney, Agent, or Firm* — Allen, Dyer, Doppelt, Milbrath & Gilchrist, P.A.

(57) ABSTRACT

A communication network may be uncooperative with an uncooperative communications device. The communication network includes mobile wireless communications devices including a collection device and forward devices. Each forward device is configured to detect a received signal characteristic associated with the uncooperative communications device, and transmit the received signal characteristic to the collection device. The collection device is configured to selectively schedule reception of the received signal characteristic based upon a timing of communications among the forward devices, and determine a parameter associated with the uncooperative communications device based upon the received signal characteristic.

32 Claims, 5 Drawing Sheets

(56) References Cited

U.S. PATENT DOCUMENTS

| | | | |
|---|---|---|---|
| 7,248,203 | B2 | 7/2007 | Gounalis |
| 7,358,887 | B2 | 4/2008 | Gounalis |
| 7,475,428 | B2 | 1/2009 | Smith et al. |
| 7,539,166 | B2* | 5/2009 | Do et al. ................. 370/335 |
| 7,944,468 | B2* | 5/2011 | Hoffman et al. ............ 348/143 |
| 8,259,652 | B2* | 9/2012 | Huang et al. ............... 370/328 |
| 8,560,609 | B2* | 10/2013 | Nathanson ................. 709/204 |
| 8,711,764 | B2* | 4/2014 | Kim et al. ................. 370/328 |
| 2002/0181492 | A1* | 12/2002 | Kasami et al. ............. 370/445 |
| 2004/0135717 | A1* | 7/2004 | Gounalis .................... 342/13 |
| 2005/0105505 | A1* | 5/2005 | Fishler et al. ............. 370/349 |
| 2006/0019679 | A1* | 1/2006 | Rappaport et al. .......... 455/456.5 |
| 2008/0144572 | A1* | 6/2008 | Makhijani .................. 370/330 |
| 2009/0074422 | A1 | 3/2009 | Stewart |
| 2010/0273504 | A1 | 10/2010 | Bull et al. |
| 2011/0148714 | A1* | 6/2011 | Schantz et al. ............. 342/458 |
| 2012/0094610 | A1* | 4/2012 | Lunden et al. ............. 455/67.13 |
| 2012/0195256 | A1* | 8/2012 | Khoury ..................... 370/328 |

OTHER PUBLICATIONS

"Multifunction radio system that enables spectrum superiority," Northrop Grumman, 2009, 2 pages.

* cited by examiner

COMMUNICATION NETWORK FOR DETECTING UNCOOPERATIVE COMMUNICATIONS DEVICE AND RELATED METHODS

FIELD OF THE INVENTION

The present invention relates to the field of wireless communications, and, more particularly, to detecting wireless communications devices and related methods.

BACKGROUND OF THE INVENTION

In government, municipal, and law enforcement applications, there is sometimes a desire to track a communications device. Since it is not uncommon for a person to carry a cellular telephone device with them on a daily basis, there may be desire by local police and fire departments to use a corresponding cellular telephone device to help locate a missing person, for example, a person trapped in a collapsed building or a fugitive. Of course, in these applications, such as tracking a cellular communications device, the device and associated user are not actively attempting to mask their location, i.e. an uncooperative communications device. Conventional approaches to communications device location include systems comprising a plurality of sensors. These systems typically use a triangulation method to determine the location of the communications device.

One approach to communications device location, for example, a cellular telephone device, is disclosed by U.S. Pat. No. 6,407,703 to Minter et al. The system of Minter et al. includes a plurality of sensors situated in multiple locations/platforms. The system uses angle of arrival (AOA), time difference of arrival (TDOA), and terrain altitude information from signal intercepts from the cellular telephone device to determine the location thereof. The sensors use accurate time synchronization for determining the TDOA of the intercepted signals.

Another approach is disclosed in U.S. Pat. No. 5,719,584 to Otto, assigned to the present application's assignee, Harris Corporation of Melbourne, Fla. This system uses a plurality of ground based sensors to determine a location of the cellular telephone device by measuring TDOA and AOA values. This network of sensors is also synchronized.

Another approach is disclosed in U.S. Patent Application Publication No. 2004/0135717 to Gounalis. Gounalis discloses a system for detecting wireless transmission signals from an emitter. The system determines and implements a selective scanning strategy, for example, using a frequency domain windowing approach.

Another approach is disclosed in U.S. Pat. No. 7,944,468 to Hoffman et al. Hoffman et al. discloses a predictive threat detection system. The system includes a sensor network spread over an urban environment, and combines data for analysis from each of these sites. A potential drawback to the above systems is that no approach provides a method for distributing information to cooperative communications devices. Moreover, deploying a large network of sensors, such as in Hoffman et al., can be expensive and impractical.

SUMMARY OF THE INVENTION

In view of the foregoing background, it is therefore an object of the present invention to provide a communication network that can efficiently track uncooperative communications devices.

This and other objects, features, and advantages in accordance with the present invention are provided by a communication network uncooperative with an uncooperative communications device, the communication network comprising a plurality of mobile wireless communications devices comprising at least one collection device and a plurality of forward devices. Each forward device is configured to detect a received signal characteristic associated with the uncooperative communications device, and transmit the received signal characteristic to the at least one collection device. The at least one collection device is configured to selectively schedule reception of the received signal characteristic based upon a timing of communications among the plurality of forward devices, and to determine a parameter associated with the uncooperative communications device based upon the received signal characteristic. Advantageously, the communication network leverages the existing plurality of mobile wireless communications devices to scout the uncooperative communications device.

In some embodiments, the communication network may further comprise a control device, and the at least one collection device may be configured to transmit the received signal characteristic to the control device. The control device may be configured to cooperate with the at least one collection device to determine the parameter associated with the uncooperative communications device based upon the received signal characteristic received from the at least one collection device.

More specifically, the control device may be configured to determine a plurality of parameters associated with the uncooperative communications device based upon the received signal characteristic received from the at least one collection device, the plurality of parameters comprising a location value, a movement value, and a transmission characteristic value, for example. Each forward device may be configured to transmit a respective locational value and time value associated with the received signal characteristic to the at least one collection device. In some embodiments, each forward device may comprise a plurality of diversity antennas and may be configured to detect the received signal characteristic associated with the uncooperative communications device using the plurality of diversity antennas.

Another aspect is directed to a method of operating a communication network uncooperative with an uncooperative communications device. The communication network comprises a plurality of mobile wireless communications devices comprising at least one collection device and a plurality of forward devices. The method comprises using each forward device to detect a received signal characteristic associated with the uncooperative communications device, and transmit the received signal characteristic to the at least one collection device. The method also includes using the at least one collection device to selectively schedule reception of the received signal characteristic based upon a timing of communications among the plurality of forward devices, and to determine a parameter associated with the uncooperative communications device based upon the received signal characteristic received from the at least one collection device.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
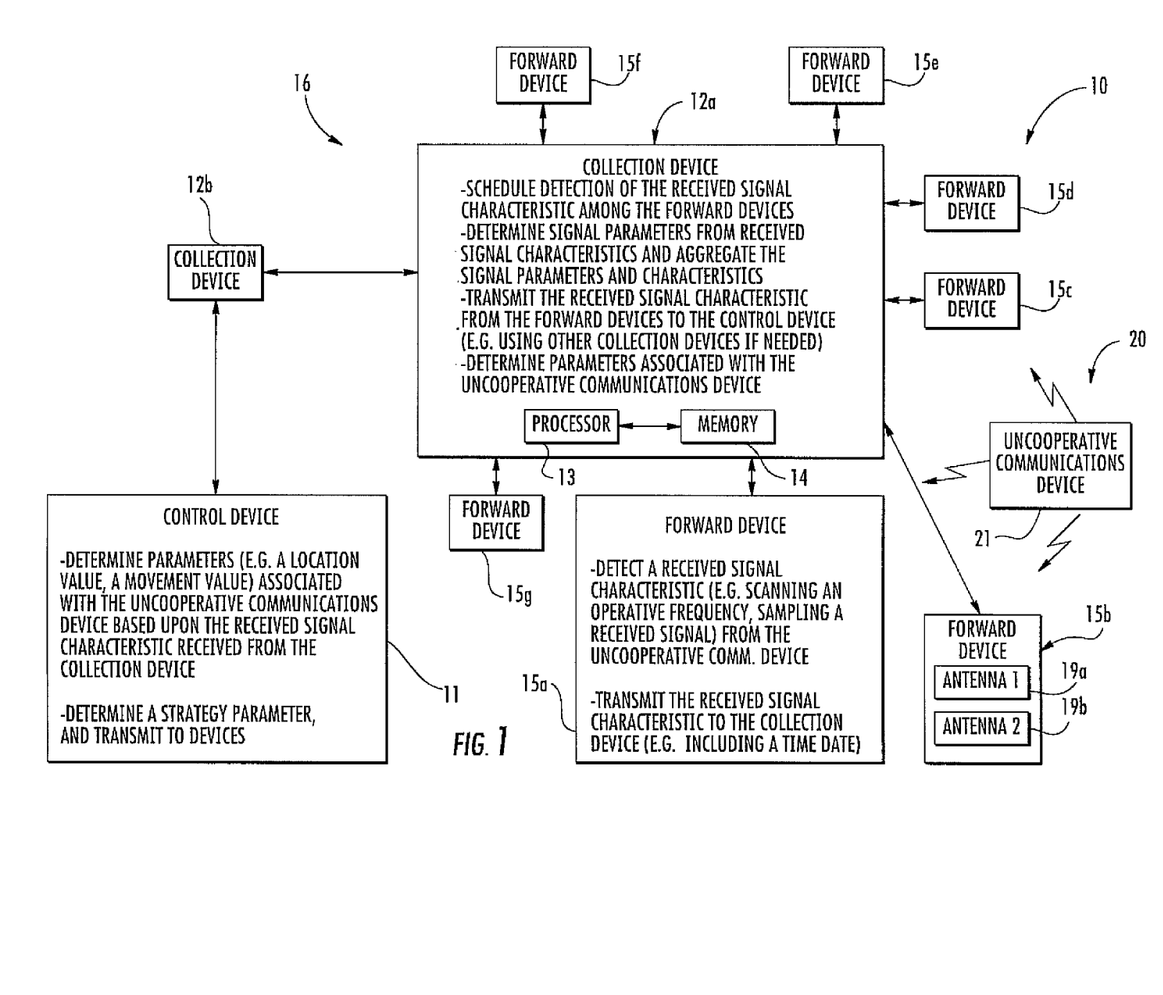
FIG. 1 is a schematic diagram of a communication network, according to the present invention.
Figure 2:
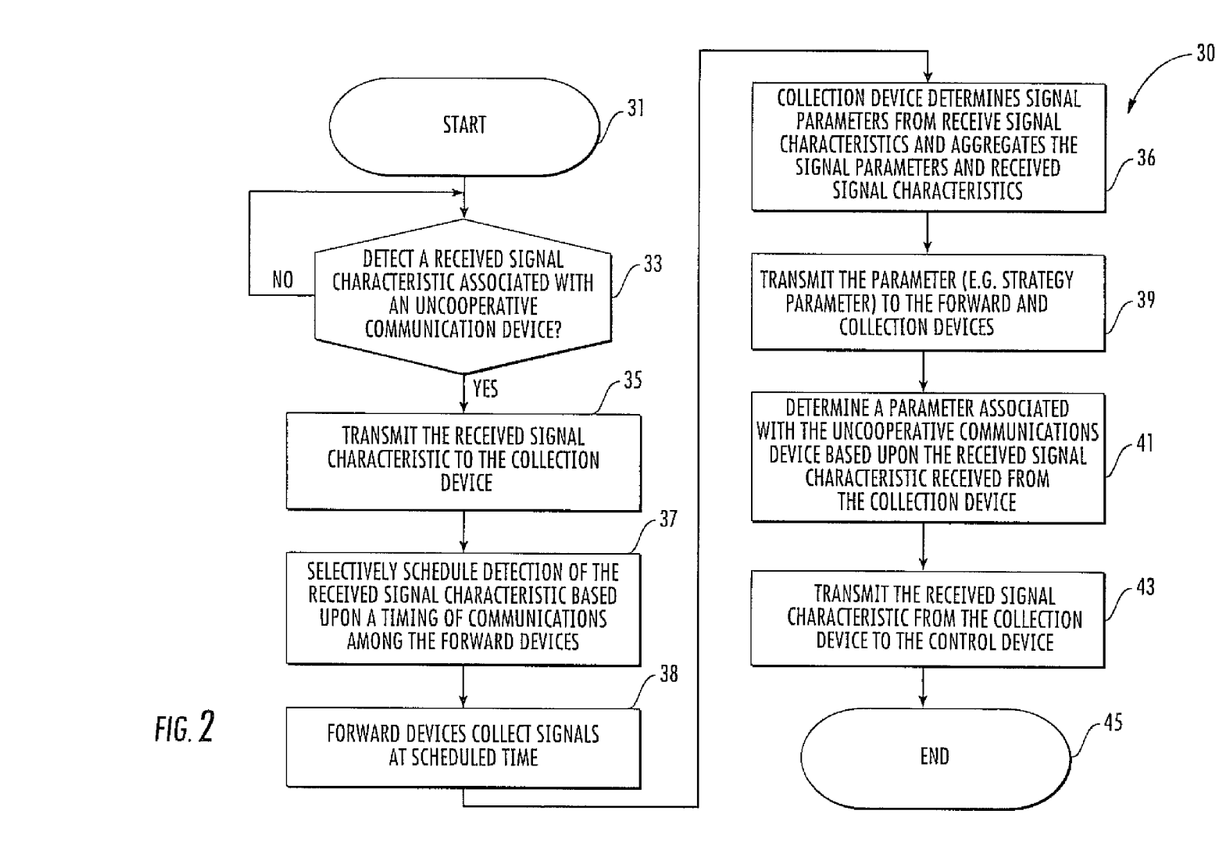
FIG. 2 is a flowchart illustrating operation of the communication network of FIG. 1.

Referring initially to FIGS. 1-2, a wireless communication system 10 comprising a communication network 16 according to the present invention is now described. Also, with reference to a flowchart 30, which begins at Block 31, a method of operating the communication network 16 is also described. The wireless communication system 10 illustratively includes an other communication network 20, uncooperative to the communication network 16, comprising an uncooperative communications device 21. Of course, the other communication network 20 may comprise a plurality of uncooperative communications devices. In other words, the communication networks 20, 16 are unfriendly with each other, i.e. they do not intentionally share communication channels.

The communication network 16 includes a control device 11, and a plurality of mobile wireless communications devices comprising a plurality of collection devices 12a-12b and a plurality of forward devices 15a-15g. For ease of illustration, only one forward device 15a and one collection device 12a are shown in detail. Of course, the other companion devices may be similarly constituted. The communication network 16 can include a wide variety of differing devices, such as handheld communications devices (e.g. walkie-talkies), vehicle mounted communications devices, and a base station device. The forward devices 15a-15g, collection devices 12a-12b, and control device 11 may perform multiple roles. For example, the collection devices 12a-12b can also function as a forward device 15a-15g in the communication network 16. In some embodiments, the control device 11 may also be a collection device 12a-12b and even a forward device 15a-15g. In other words, the collection/receiver devices can perform the functionality of multiple devices, and they are not limited to a single specific role.

Each forward device 15a-15g is configured to detect a received signal characteristic associated, i.e. regarding a signal emitted therefrom, with the uncooperative communications device 21 (Block 33). For example, the received signal characteristic may comprise one or more of a bandwidth value, an assigned time value, a frequency value, and a received signal strength value.

Once a received signal characteristic is detected, the forward device 15a-15g is configured to transmit the received signal characteristic to the collection device 12a (Block 35). In some embodiments, the forward device 15a-15g may be configured to detect the received signal characteristic by scanning an operative frequency of the respective forward device. In the illustrated embodiment, each forward device 15a-15g comprises a plurality of diversity antennas 19a-19b and is configured to detect the received signal characteristic associated with the uncooperative communications device 21 using the plurality of diversity antennas. The forward device 15a-15g scans each operative frequency for all the on-board antennas 19a-19b. Multiple antennas 19a-19b at a forward device 15a-15g could provide additional capability on bearing, amplitude, and other parameters.

Typically, the forward device 15a-15g transmits the data to the collection device 12a in charge of the local subnet in the communication network 16, such as a master node (mobile ad hoc network embodiments) or base station. In some embodiments, the forward device 15a-15g may be configured to transmit a respective locational value and time value associated with the received signal characteristic to the collection device 12a-12b, i.e. the forward node time/date/location stamps the data.

As such, the collection device 12a is configured to selectively schedule detection or reception of the received signal characteristic based upon a timing of communications among the plurality of forward devices 15a-15g. The collection device 12a is configured to schedule detection of the received signal substantially simultaneously for each of the forward devices 15a-15g, and to transmit the received signal characteristic to the control device 11 (Blocks 37-38). In the illustrated embodiment, the collection devices 12a-12b serve as a backbone of the communication network 16 and route the information to the control device 11 (Block 39). In other embodiments, the collection devices 12a-12b may each have a direct coupling to the control device 11. The collection devices 12a-12b may be configured to coordinate with forward devices 15a-15g in a respective subnet for cooperation with nearby other forward devices to detect the received signal characteristic associated with the uncooperative communications device 21.

For example, if a particular forward device 15a-15g cannot perform detection processes due to significant communication demands by the respective user (e.g. reduced receive sensitivity due to ongoing transmissions), the collection device 12a-12b may offload the detection duties to nearby forward devices 15a-15f. The communication network 16 may address this situation with the control device 11 scheduling a coordinated detection in these locations when the forward device 15a-15g is known not to have any scheduled transmissions or reception. An alternate approach is to task many forward devices 15a-15g to make the detection. If a forward device 15a-15g is "busy," then it quietly disregards the command. The collection node 12a-12b can still make the measurement of location, movement, other if enough forward nodes do act on the request.

In some embodiments, the plurality of forward devices 15a-15g may be configured to operate based upon a CSMA protocol, and each forward device may be configured to detect the received signal characteristic during an absence of traffic directed thereto. In different embodiments (FIG. 3), the plurality of forward devices 15a-15g may be configured to operate based upon a TDMA protocol, and the collection device 12a-12b may be configured to assign a time slot for detection of the received signal characteristic associated with the uncooperative communications device 21. In other embodiments, the forward devices 15a-15g may be configured to operate with a dedicated guard receiver separate from the communications receiver. In addition to a guard receiver, other systems may use multiple antennas.

In the illustrated embodiment, the collection device 12a includes a processor 13 and a memory 14 cooperating therewith. The processor 13 may be configured to store one or more uncooperative communications device type features in the memory 14 and to correlate the received signal characteristic from the plurality of forward devices 15a-15g with at least one uncooperative communications device type feature. For example, the uncooperative communications device type feature may comprise a waveform feature characteristic or a transmission signal signature of some form. Advantageously, the control device 11 may store equipment correlations with uncooperative communications device types, thereby determining uncooperative equipment location data. Also advantageously, the forward device 15a-15g may store uncooperative communications device type features in memory and correlate against them. This may reduce the transmission bandwidth required in getting data/information from the forward nodes to the collection node.

In other embodiments, the forward devices 15a-15g and/or the collections devices 12a-12b may be configured to detect the received signal characteristic by sampling a received signal from the uncooperative communications device 21, and to transmit the sampled received signal data to an upstream collection device or the control device 11. In other words, the heavy processing burdens are shifted up the communication chain to devices that likely have greater resources.

In certain embodiments, the collection device 12a-12b may be configured to determine a plurality of received signal characteristics from the data received from the forward devices 15a-15g, such as a time of arrival value, and a Doppler value. In these embodiments, some pre-processing is performed by the collection devices 12a-12b before it is routed to the control device 11. The collection device 12a-12b aggregates the data it receives, and also calculates parameters based on the signals received (Block 36). These parameters can include TDOA, FDOA, amplitude differences, etc. It may also perform location estimation; however, this would typically be done at the control device 11.

The control device 11 is configured to determine one or more parameters associated with the uncooperative communications device 21 based upon the received signal characteristic received from the collection devices 12a-12b (Block 41). For example, the plurality of parameters may comprise a location value, a movement value, a transmission characteristic value, and/or an accompanying equipment parameter.

Additionally, the control device 11 is configured to determine a strategy parameter associated with the uncooperative communications device 21 and based upon the determined parameter. For example, the control device 11 may determine that associated users of the other communication network 20, i.e. the one or more uncooperative communications devices 21, may be strategically outmaneuvering users in the communication network 16. The control device 11 is configured to transmit the parameter and the strategy parameter to the plurality of mobile wireless communications devices 15a-15g, 12a-12b (Blocks 43, 45).

In some embodiments, the control device 11 can be omitted, and its functionality can be assigned to the most capable collection device 12a-12b. In these embodiments, the collection devices 12a-12b serve not only as the backbone of the communications network 16 but also the brain.

In some embodiments, the collection devices 12a-12b may arbitrate network time for simultaneous listening, perform signal correlation determination, perform time difference of arrival estimates, perform power difference of arrival estimates, perform frequency difference of arrival estimates, and forward results to next collection point. For the forward devices 15a-15g, in some embodiments, the devices may be configured to listen at an assigned time, frequency, and bandwidth, perform signal detection, perform signal evaluation if assigned, provide a time stamp with global positioning system (GPS), and lastly send results to assigned collection node.

In some embodiments, the control device 11 may be configured to maintain a list of radios, including capability, location, and current search list for each forward device 15a-15g. The control device 11 can also be configured to serve as the final processing stage, which includes geolocation estimation, tracking algorithms, and other processing. The control device 11 may also be configured to manage results by updating search descriptions, assigning/changing collection points, and pushing results updates back to all nodes. In some embodiments, the command/control can be an external process or internal to the radio. In versatile applications, the command/control application can exist at any node in the communication network 16.

Advantageously, the communication network 16 leverages the existing plurality of mobile wireless communications devices 12a-12b, 15a-15g to scout the uncooperative communications device 21. For example, the users of the communication network 16 can be informed of hidden uncooperative communications device 21 users via the command/control backbone. The communication network 16 may determine location, density of personnel. Also, if the control device 11 is able to determine the type of device for the uncooperative communications device 21 (particularly when the communications device type can be associated with equipment), the control device can forward this information to nearby users in the communication network 16 for strategic reasons.

Another aspect is directed to a method of operating a communication network 16 uncooperative with an other communication network 20. The other communication network 20 comprises an uncooperative communications device 21. The communication network 16 comprises a control device 11, and a plurality of mobile wireless communications devices comprising a collection device 12a-12b and a plurality of forward devices 15a-15g. The method comprises using each forward device 15a-15g to detect a received signal characteristic associated with the uncooperative communications device 21, and transmit the received signal characteristic to the collection device 12a-12b, and using the collection device to selectively schedule detection of the received signal characteristic based upon a timing of communications among the plurality of forward devices, and to transmit the received signal characteristic to the control device. The method also includes using the control device 11 to determine a parameter associated with the uncooperative communications device 21 based upon the received signal characteristic received from the collection device 12a-12b.

Figure 3:
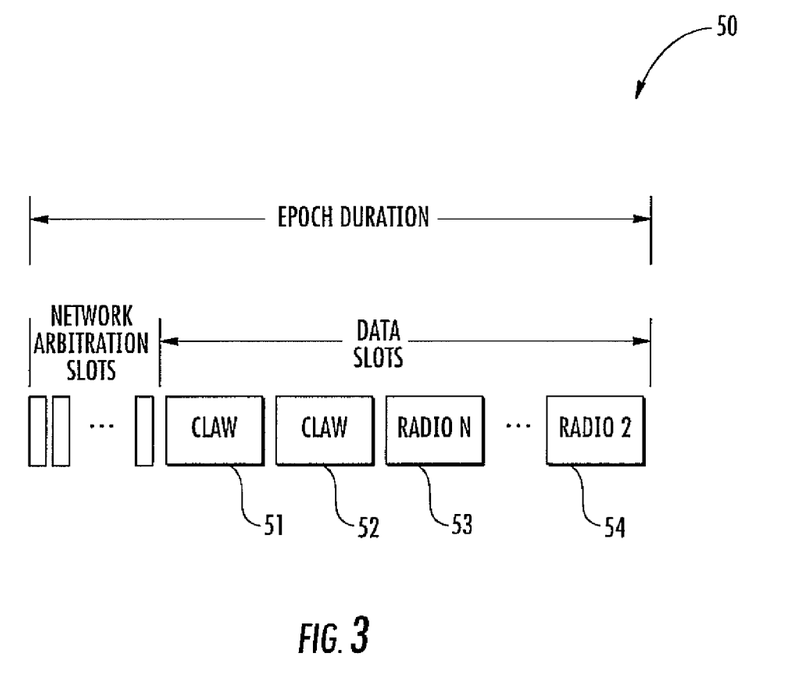
FIG. 3 is a schematic diagram illustrating time slot allocation in one embodiment of the communication network, according to the present invention.

Referring to FIG. 3, as will be appreciated by those skilled in the art, an exemplary implementation of the wireless communication system 10 is illustrated. There are many different kinds of network protocols. A brief description of TDMA and CSMA are shown as two examples.

TDMA Media Access Control (MAC) Protocol Network

Typical ad-hoc TDMA systems include a period of network arbitration slots followed by assigned data slots 51-54. Within each data slot, a predetermined radio is allowed to transmit. The pattern of arbitration and data slots is repeated over and over. This fundamental duration is called the epoch duration 50.

Each radio in the network arbitrates an assigned time slot to transmit. During the other allocated radio transmit slots, each radio will listen to the transmission for data that is addressed to them. The assignment of a data slot is controlled by the MAC layer for the communications waveform. Typically, a single radio in the network acts as the arbitrator master of the time slots.

When a forward node receives a request for a communication location aware waveform (CLAW) signal detection, the CLAW application can try to listen on unused slots. This can be done on slots that are assigned to be empty or on slots when a signal is not detected after a brief amount of time. If slots are not open, requests that some number of slots be allocated for it and other nodes to use for a predetermined about of time can be made to the network arbitrator. Once the time has been granted, the assigned radio will listen at the desired frequency, bandwidth, and time as illustrated in FIG. 3.

For signal detection, this time can be relatively small. For signal geolocation, the time required will increase. If the allotted CLAW time duration is not sufficient for the signals for geolocation, a large number of slots 51-54 can be allocated (up to a complete epoch 50) for a brief period of time. The additional amount of data will need to be compressed prior to collection for correlation.

CSMA MAC Protocol Network

In the CSMA architecture, each unit sends a request to send (RTS) message to the desired receiving station for point-to-point transmissions. The receiving station acknowledges the RTS message with a clear to send (CTS) message. On receipt of a CTS message, the transmitting node transmits the data package. In some instances, the receiving node responds with a "done" message. If there is traffic on the channel or if the receiving station does not respond, the requesting transmitter goes into a random back off duration before attempting to transmit again.

For the CSMA protocol, the detection durations do not necessarily have to be coordinated. If there is traffic on the channel and it is not intended for the forward node, this node is free to scan other frequencies to detect signals of interest. If a channel is heavily utilized by a particular node, then it must prioritize time for scanning along with RX or TX data. This can be accomplished by not providing a CTS message for a prescribed time or holding off lower priority data packets.

However, the time and signal for geolocation will have to be coordinated. All forward nodes may need to be receiving at exactly the same time. The collection nodes are required to communicate the time and duration to the each of the respective forward nodes under its supervision.

If another radio tries to communicate with a radio that is servicing a CLAW search, the CSMA protocols will time out. It is helpful that the collection nodes understand the CSMA protocol such as to efficiently assign time without a large penalty in system throughput due to CSMA back off durations.

Sequence Diagram

Figure 4:
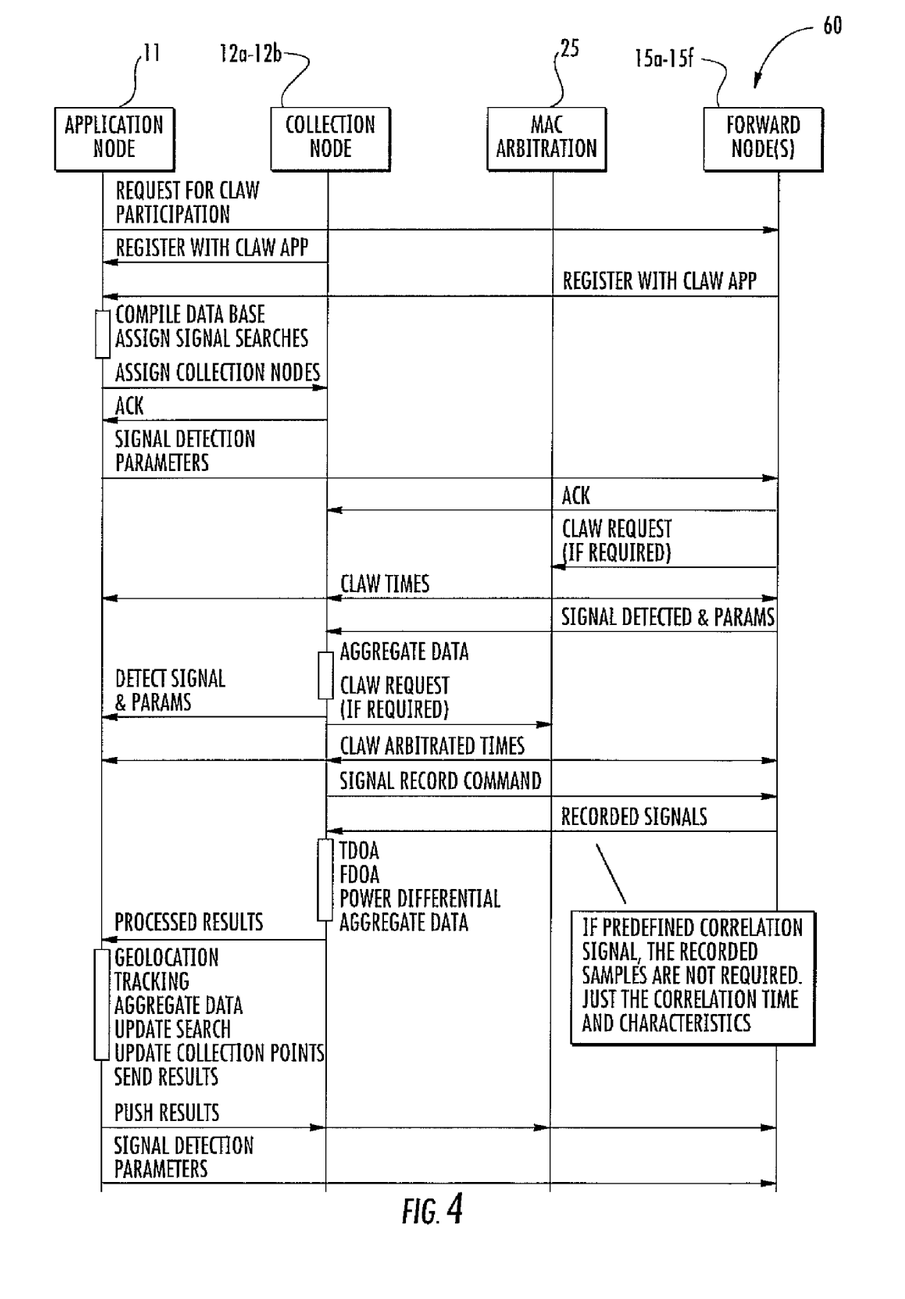
FIG. 4 is a schematic diagram illustrating a timing sequence between devices in one embodiment of the communication network, according to the present invention.

Referring now to FIG. 4, a sequence diagram 60 illustratively includes the application node (control device 11 from hereinabove), the collection node (collection device 12a-12b from hereinabove), and the forward node(s) (forward devices 15a-15g from hereinabove), each are given a separate block. There can be many forward nodes in the configuration, and some nodes can perform multiple roles. For example, a collection node may also be a forward node. The application node may be a collection node or forward node as well. These nodes may reside anywhere in a network.

Simulation

Figure 5:
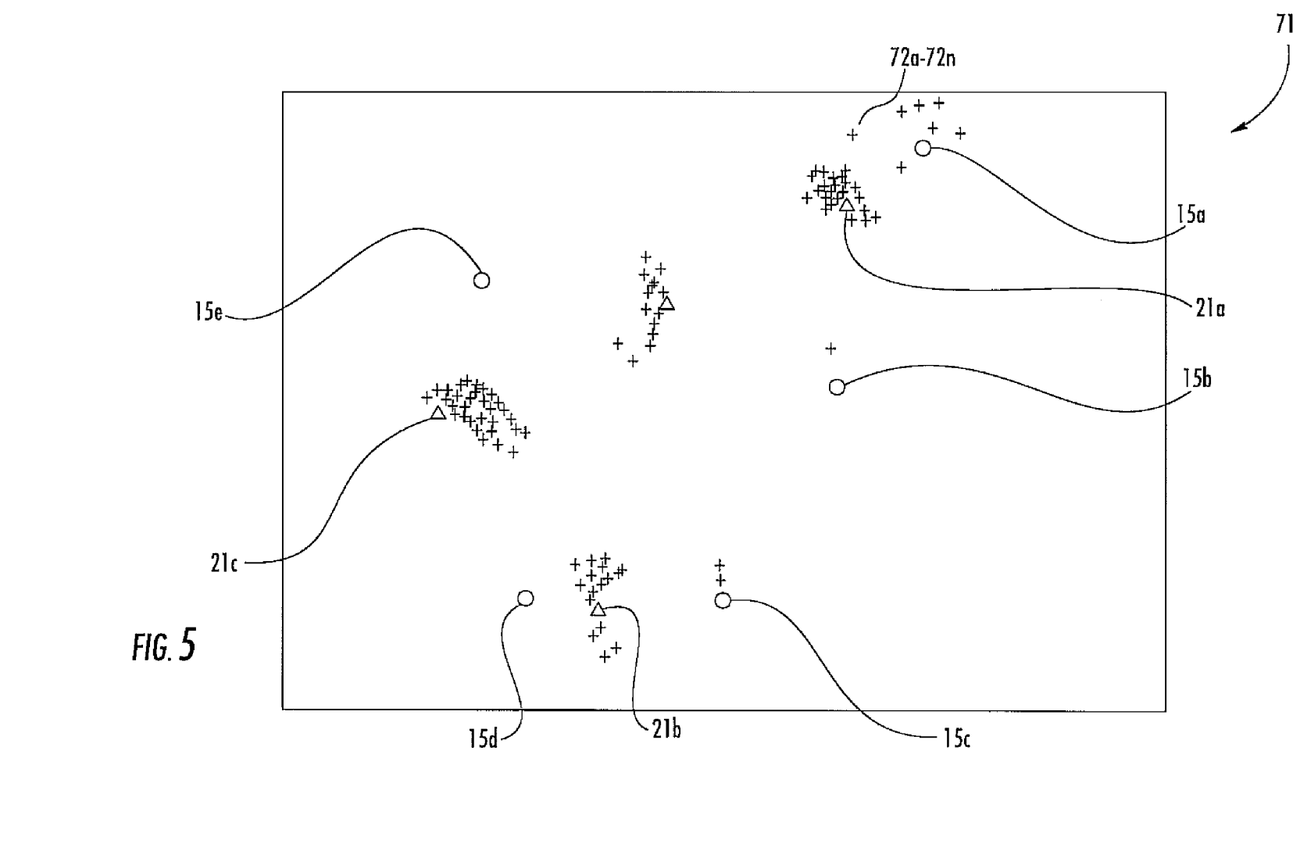
FIG. 5 is a chart illustrating a simulation for an embodiment of the communication network, according to the present invention.

Simulations were performed for a system looking for a predefined signal pattern. This pattern was stored in the forward nodes. The MAC search window was predefined and fixed. Each radio in the network searched for the signal by correlating the received signal to the known preamble. On detecting the preamble, the time of the correlation was determined using a GPS signal. This time was logged. Offline, the times were post processed with only TDOA techniques. The target signals were placed at different locations around Rochester, N.Y. The TDOA measurements were taken at each location. The results are shown in the image 70 of FIG. 5. The circles 15a-15g are the locations of the forward nodes. The triangles show the location of the unknown transmitter (uncooperative communications devices 21a-21c). Each x-mark 72a-72n represents a single estimate based on a single observation of the unknown transmitter location.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communication network uncooperative with an uncooperative communications device, the communication network comprising:
a plurality of mobile wireless communications devices comprising at least one collection device and a plurality of forward devices, each forward device configured to detect a received signal characteristic associated with the uncooperative communications device, the uncooperative communications device and said plurality of mobile wireless communications devices not sharing a communication channel, transmit the received signal characteristic to said at least one collection device;
said at least one collection device configured to
selectively schedule listening for the received signal characteristic based upon a timing of communication transmissions among adjacent forward devices, and
determine a parameter associated with the uncooperative communications device based upon the received signal characteristic received from said at least one collection device.

2. The communication network of claim 1 further comprising a control device; wherein said at least one collection device is configured to transmit the received signal characteristic to said control device; and wherein said control device is configured to cooperate with said at least one collection device to determine the parameter associated with the uncooperative communications device based upon the received signal characteristic received from said at least one collection device.

3. The communication network of claim 1 wherein the parameter comprises at least one of a location value, a movement value, and a transmission characteristic value.

4. The communication network of claim 1 wherein each forward device is configured to transmit a respective locational value and time value associated with the received signal characteristic to said at least one collection device.

5. The communication network of claim 1 wherein each forward device is configured to detect the received signal characteristic by scanning an operative frequency of the respective forward device.

6. The communication network of claim 1 wherein said at least one collection device comprises a processor and a memory cooperating therewith; and wherein said processor is configured to store an uncooperative communications device type feature in said memory and to correlate the received signal characteristic from said plurality of forward devices with the uncooperative communications device type feature.

7. The communication network of claim 1 wherein each forward device is configured to detect the received signal characteristic by sampling a received signal from the uncooperative communications device, and to transmit the sampled received signal data to said at least one collection device.

8. The communication network of claim 2 wherein said control device is configured to:
   determine a strategy parameter associated with the uncooperative communications device and based upon the parameter; and
   transmit the parameter and the strategy parameter to said plurality of mobile wireless communications devices.

9. The communication network of claim 1 wherein said at least one collection device is configured to determine a plurality of received signal characteristics comprising a time of arrival value, and a Doppler value from the received signal characteristic from said plurality of forward devices.

10. The communication network of claim 1 wherein each forward device comprises a plurality of diversity antennas and is configured to detect the received signal characteristic associated with the uncooperative communications device using the plurality of diversity antennas.

11. The communication network of claim 1 wherein said plurality of forward devices is configured to operate based upon a time division multiple access (TDMA) protocol; and wherein said at least one collection device is configured to selectively schedule the listening for the received signal characteristic based upon the timing of communication transmissions among the adjacent forward devices using an assigned slot.

12. The communication network of claim 1 wherein said plurality of forward devices is configured to operate based upon a Carrier Sense Multiple Access (CSMA) protocol; and wherein each forward device is configured to detect the received signal characteristic during an absence of traffic directed thereto.

13. A communication network uncooperative with an uncooperative communications device, the communication network comprising:
   a control device; and
   a plurality of mobile wireless communications devices comprising at least one collection device and a plurality of forward devices, the uncooperative communications device and said plurality of mobile wireless communications devices not sharing a communication channel, each forward device configured to
      detect a received signal characteristic associated with the uncooperative communications device, and
      transmit the received signal characteristic, and a respective locational value and time value associated with the received signal characteristic to said at least one collection device;
   said at least one collection device configured to selectively schedule listening for the received signal characteristic based upon a timing of communication transmissions among adjacent forward devices, and to transmit the received signal characteristic to said control device;
   said control device configured to determine a plurality of parameters associated with the uncooperative communications device based upon the received signal characteristic received from said at least one collection device, the plurality of parameters comprising at least one of a location value, a movement value, and a transmission characteristic value.

14. The communication network of claim 13 wherein each forward device is configured to detect the received signal characteristic by scanning an operative frequency of the respective forward device.

15. The communication network of claim 13 wherein said at least one collection device comprises a processor and a memory cooperating therewith; and wherein said processor is configured to store an uncooperative communications device type feature in said memory and to correlate the received signal characteristic from said plurality of forward devices with the uncooperative communications device type feature.

16. The communication network of claim 13 wherein each forward device is configured to detect the received signal characteristic by sampling a received signal from the uncooperative communications device, and to transmit the sampled received signal data to said at least one at least one collection device.

17. The communication network of claim 13 wherein said control device is configured to:
   determine a strategy parameter associated with the uncooperative communications device and based upon the parameter; and
   transmit the parameter and the strategy parameter to said plurality of mobile wireless communications devices.

18. The communication network of claim 13 wherein said at least one collection device is configured to determine a plurality of received signal characteristics comprising a time of arrival value, and a Doppler value from the received signal characteristic from said plurality of forward devices.

19. A method of operating a communication network uncooperative with an uncooperative communications device, the communication network comprising a plurality of mobile wireless communications devices comprising at least one collection device, and a plurality of forward devices, the uncooperative communications device and the plurality of mobile wireless communications devices not sharing a communication channel, the method comprising:
   detecting, using each forward device, a received signal characteristic associated with the uncooperative communications device, and transmitting the received signal characteristic to the at least one collection device;
   selectively scheduling, using the at least one collection device, listening for the received signal characteristic based upon a timing of communication transmissions among adjacent forward devices; and
   determining, using the at least one collection device, a parameter associated with the uncooperative communications device based upon the received signal characteristic.

20. The method of claim 19 wherein the communication network further comprises a control device; further comprising:
   transmitting, using the at least one collection device, the received signal characteristic to the control device; and
   the control device and the at least one collection device cooperating with each other to determine the parameter associated with the uncooperative communications device based upon the received signal characteristic received from the at least one collection device.

21. The method of claim 19 wherein the parameter comprises at least one of a location value, a movement value, and a transmission characteristic value.

22. The method of claim 19 further comprising transmitting, using each forward device, a respective locational value and time value associated with the received signal characteristic to the at least one collection device.

23. The method of claim 19 further comprising detecting, using each forward device, the received signal characteristic by scanning an operative frequency of the respective forward device.

24. The method of claim 19 further comprising storing, using the at least one collection device, an uncooperative communications device type feature in a memory and correlating the received signal characteristic from the plurality of forward devices with the uncooperative communications device type feature.

25. The method of claim 19 further comprising detecting, using each forward device, the received signal characteristic by sampling a received signal from the uncooperative communications device, and transmitting the sampled received signal data to the at least one collection device.

26. The method of claim 19 further comprising:
determining a strategy parameter associated with the uncooperative communications device and based upon the parameter; and
transmitting the parameter and the strategy parameter to the plurality of mobile wireless communications devices.

27. The method of claim 19 further comprising determining a plurality of received signal characteristics comprising a time of arrival value, and a Doppler value from the received signal characteristic from the plurality of forward devices.

28. The method of claim 19 wherein each forward device comprises a plurality of diversity antennas; and further comprising detecting the received signal characteristic associated with the uncooperative communications device using the plurality of diversity antennas.

29. The method of claim 19 further comprising:
operating the plurality of forward devices based upon a time division multiple access (TDMA) protocol; and
assigning a time slot for selectively scheduling the listening for the received signal characteristic based upon the timing of communication transmissions among the adjacent forward devices using the at least one collection device.

30. The method of claim 19 further comprising:
operating the plurality of forward devices based upon a Carrier Sense Multiple Access (CSMA) protocol; and
detecting the received signal characteristic during an absence of traffic directed thereto using each forward device.

31. The communication network of claim 1 wherein said at least one collection device is configured to selectively schedule simultaneous listening using the adjacent forward devices for the received signal characteristic.

32. The communication network of claim 1 wherein said at least one collection device is configured to selectively schedule the listening based upon a transmission data load of a respective forward device.

* * * * *